No. 753,851. PATENTED MAR. 8, 1904.
J. BYSTROM.
EXTENSION HANGER FOR LAMPS.
APPLICATION FILED DEC. 7, 1903.
NO MODEL.
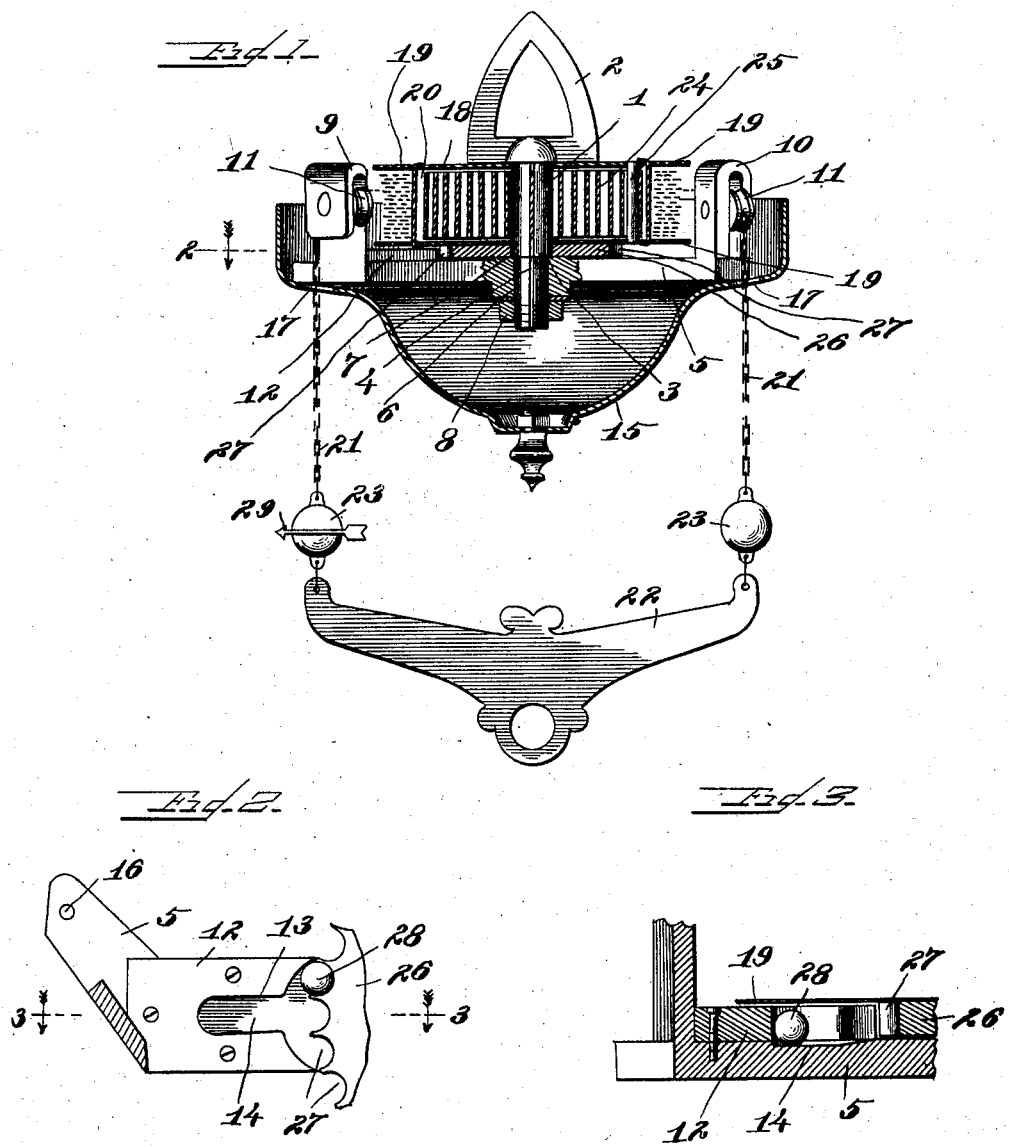

No. 753,851. Patented March 8, 1904.

UNITED STATES PATENT OFFICE.

JOHN BYSTROM, OF CHICAGO, ILLINOIS.

EXTENSION-HANGER FOR LAMPS.

SPECIFICATION forming part of Letters Patent No. 753,851, dated March 8, 1904.

Application filed December 7, 1903. Serial No. 184,159. (No model.)

*To all whom it may concern:*

Be it known that I, JOHN BYSTROM, a citizen of the United States, residing at Chicago, in the county of Cook and State of Illinois, have invented certain new and useful Improvements in Extension-Hangers for Lamps, of which the following is a specification.

One of the objects of this invention is the production of an improved extension-hanger for lamps.

A further object of the invention is the production of an improved locking means for such extension-hangers.

In the accompanying drawings, Figure 1 is a vertical central section through an extension-hanger embodying my invention. Fig. 2 is a section on dotted line 2 2 of Fig. 1. Fig. 3 is a sectional view through the locking device, taken on dotted line 3 3 of Fig. 2.

In the drawings, 1 refers to the suspension-stem of this hanger, said stem having a rigid suspension-loop 2 at its upper end and having its lower end reduced in diameter, forming a shoulder 3. A slot 4 is cut in the side of the suspension-stem 1 for a purpose to be hereinafter mentioned.

A base-bar 5 has an opening 6 midway of its ends for the reception of the suspension-stem 1 and upon its upper side is provided with an annular boss 7, surrounding the opening 6, upon which boss the shoulder 3 of the suspension-stem 1 is adapted to rest. A nut 8, threaded upon the lower end of the stem 1, secures said stem and base-bar rigidly together. At each of its ends the base-bar 4 supports bearing-brackets 9 and 10, formed integral with the base-bar, in each of which brackets is journaled a sheave 11. Between the bearing-bracket 9 and the opening 6 a plate 12 is secured in any suitable way to the base-bar 5, said plate having a bifurcation 13 in one of its ends, the outer ends of the walls of which bifurcation are flared, as shown in Fig. 2. The upper side of the base-bar 5 beneath the bifurcation 13 is slightly recessed at 14. The plate 12 constitutes the side walls and outer end wall of the housing for a locking-ball, to be hereinafter described, the upper side of the base-bar 5 forming the bottom or floor of said housing.

An ornamental casing or shell 15 is secured beneath the base-bar 5 by means of screws 16, passing through suitable openings in said casing into the ends of said base-bar. Adjacent to the housings 9 and 10 the casing 15 is provided with openings 17 for a purpose to appear hereinafter.

A drum 18, having peripheral flanges 19 and a central chamber 20, is rotatably mounted upon the suspension-stem 1. This drum is adapted to carry upon its periphery two chains 21, which chains are each attached at one of their ends to said drum. The chains 21 extend from the drum 18 over the sheaves 11 and through the openings 17 in the casing 15, being connected at their lower ends with a yoke 22 of any form suitable for supporting a lamp. Stop-balls 23, interposed between the links at the lower ends of the chains 21, limit the extent of the upward movement of the yoke 22 by coming into contact with the casing 15. The chamber 20 of the drum 18 contains a coil-spring 24, having its inner end secured within the slot 4 in the suspension-stem 1 and having its outer end attached to the drum 17 by means of a pin 25, rigidly fixed to said drum.

Upon the under side of the drum 18 and concentric therewith is secured a locking-disk 26, having notches 27 in its periphery. A locking-ball 28 is adapted to lie within the bifurcation 13 of the plate 12 and the recess 14 of the base-bar 5. When said base-bar is tilted in the proper direction, the locking-ball 28 rolls out of its housing into engagement with one of the locking-notches 27 of the disk 26. The plate 12 extends into close proximity to the periphery of said locking-disk, thus preventing the escape of the locking-ball 28 from its housing.

When the locking-ball 28 is in engagment with one of the locking-notches 27 of the disk 26, the drum 18 is locked against rotation by its coil-spring 24. To release the drum to the action of said spring in order to raise or lower the lamp supported by the hanger, the drum is rotated slightly in one or the other directions in order to release the stop-ball 28 and permit it to roll out of the locking-notch with which it was in engagement into its housing.

As soon as the locking-ball 28 has been thus disengaged from the locking-notch the lamp may be raised or lowered by drawing down the lamp or releasing it to the action of the coil-spring 25. When the proper position of the lamp has been reached, the locking-ball 28 is caused to roll into engagement with one of the notches 27 of the locking-disk 26 by tilting the hanger in the direction of the arrow 29 of one of the stop-balls 23.

It is clear that the embodiment herein shown of this invention is susceptible of various changes without departing from the spirit and scope of my invention, wherefore I desire to have it understood that I do not limit myself to the precise details herein set forth.

I claim as my invention—

1. In an extension-hanger for lamps, in combination, a base-bar; a drum rotatably mounted on said base-bar; a spring arranged to rotate said drum; a locking-disk secured with relation to said drum and provided in its periphery with locking-notches; a ball arranged to enter said notches; and a housing for said ball, said housing opening directly into the locking-notches in said locking-disk, the side walls of said housing being in a position to engage the portion of the ball projecting from the locking-notch in which it lies upon a rotation of said disk in either direction.

2. In an extension-hanger for lamps, in combination, a base-bar; a drum rotatably mounted on said base-bar; a spring arranged to rotate said drum; a locking-disk fixed with relation to said drum and provided in its periphery with locking-notches; a ball arranged to enter said notches; and a housing for said ball lying outside of the periphery of said locking-disk and opening directly into the locking-notches of said disk, the side walls of said housing being in a position to engage the portion of the ball projecting from the locking-notch in which it lies upon a rotation of said disk in either direction.

3. In an extension-hanger for lamps, in combination, a base-bar; a drum rotatably mounted on said base-bar; a spring arranged to rotate said drum; a locking-disk fixed with relation to said drum and provided in its periphery with locking-notches; a ball arranged to enter said notches and project beyond the periphery of said locking-disk; and a housing for said ball which housing comprises a bifurcated plate secured to said base-bar, the bifurcation in said plate opening directly into the locking-notches in said locking-disk.

4. In an extension-hanger for lamps, in combination, a base-bar; a drum rotatably mounted upon said base-bar; a spring arranged to rotate said drum; a locking-disk provided with a plurality of locking-notches in its periphery, secured upon the under side of said drum; a ball arranged to enter said notches and project beyond the periphery of said locking-disk; and a housing for said ball mounted upon the upper side of said base-bar, which housing comprises a bifurcated plate, the bifurcation in said plate opening directly into the locking-notches in said locking-disk.

5. In an extension-hanger for lamps, in combination, a base-bar; a drum rotatably mounted upon said base-bar; a spring arranged to rotate said drum; a locking-disk provided with a plurality of locking-notches in its periphery, secured upon the under side of said drum; a ball arranged to enter said notches and project beyond the periphery of said locking-disk; and a housing for said ball mounted upon the upper side of said base-bar, the side walls of said housing being in a position to engage the portion of the ball projecting from the locking-notch in which it lies upon a rotation of said disk.

6. In an extension-hanger for lamps, in combination, a base-bar; a drum rotatably mounted upon said base-bar; a spring arranged to rotate said drum; a locking-disk provided with a plurality of locking-notches in its periphery, secured upon the under side of said drum; a ball arranged to enter said notches and project beyond the periphery of said locking-disk; and a housing for said ball mounted upon the upper side of said base-bar, which housing comprises a bifurcated plate, the bifurcation in said plate having a flaring open end facing the locking-notches in the locking-disk, forming side walls adapted to engage the portion of the ball projecting from the locking-notch in which it lies upon a rotation of the disk, the upper surface of said base-bar beneath the bifurcation being inclined downwardly away from the open end of said bifurcation.

JOHN BYSTROM.

Witnesses:
L. L. MILLER,
GEORGE L. CHINDAHL.